those corresponding to benzoic, toluic, etc.; to the dicarboxylic aromatic acids of the class typified by phthalic acid; to acetic, and stearic acids, and to the aliphatic dibasic acids, as adipic, sebacic, and succinic acids yield the better results. In general, preference is for the dibasic acids.

These corresponding acylating agents may be conveniently used either in the form of the acid chloride, or where conveniently available, of the acid anhydride, both being applicable in esterification reactions, although in general the use of the acid chloride is preferred. By this means the esterification or acylation reaction may be conveniently carried out as a continuation of the original Friedel-Crafts reaction employed for the initial condensation of the hydroxyaromatic compound with the chlorwax. This method of synthesis also makes use of anhydrous aluminum chloride and for this purpose aluminum chloride of the ordinary technical grade of purity may be used.

In the preparation of the novel pour point depressant with which this invention is concerned, the first step is the formation of a heavy alkyl-substituted hydroxy-aromatic compound, which is accomplished by means of the Friedel-Crafts reaction between the hydroxyaromatic compound and chlorinated heavy aliphatic hydrocarbon, as for instance between phenol and chlorwax. The proportions of these reagents are so chosen that the composition of the resulting product corresponds preferably to not less than about that of a triwax-substituted compound, and within this range a composition corresponding to about that of the tetrawax-substituted compound usually is preferred. This proportioning is accomplished by using chlorwax of a known composition, and adjusting the relative amounts of the reactants so that for one equivalent of hydroxyaromatic compound, there are not less than about three and preferably about four equivalents of chlorine present in the reaction mixture. After formation of the wax-substituted hydroxy-aromatic compound, it is acylated by reacting it with an acylating agent containing the desired acyl radical. In carrying out this step of the process, the proportions of the reactants are preferably such that they correspond to a completely esterified hydroxyaromatic compound. Lesser proportions of acylating agent may be used with correspondingly lesser improvement in stabilization, but proportions corresponding to complete esterification are preferred.

In connection with this step of the process of the present invention, the term "acylation" is used herein in a generic sense. On the other hand, since we have found that the major portion at least of the product resulting from the acylation of a wax-substituted phenol consists of an ester and a minor proportion of ketones and other substances, such as lactones, of lesser effectiveness as pour point depressants, the terms "esterification" and "ester" are frequently used herein respectively in referring to the process and product of the present invention.

The procedure for forming the pour point depressant of the present invention is similar in all cases for the first step, viz., that of forming the wax-substituted hydroxyaromatic compound. The hydroxyaromatic compound and the chlorwax in suitable proportions are melted together and heated to a temperature of about 150° F., and then there is added an amount of aluminum chloride corresponding to about 3% of the weight of the chlorwax. Substantial variation from this preferred percentage usually will result in the necessity of using undesirable reaction temperatures, and may also lead to undesirable rates of reaction and the formation of undesirable by-products. The mixture is then heated slowly to a temperature of about 350° F., the whole time required for such heating being about two hours. Evolution of hydrochloric acid gas usually ceases substantially when 350° F. is attained, although if this does not occur the mixture is held at this temperature for a short while longer or until such evolution of gas is substantially completed. The reaction mixture is then cooled to the temperature desired to be used in the esterification. Substantial deviation from the procedure of heating and the temperature limits above outlined results in the formation of a reaction product which is much less desirable and frequently entirely objectionable for the purposes of this invention.

In the preferred acylation procedure, employing acid chlorides, the temperature of the reaction in general should be below 350° F., and above 100° F., and under such conditions the esterification takes place almost immediately upon the addition of the acylating or esterifying agent or compound containing the acid radical. The esterification reaction is therefore conveniently governed by the rate of addition of the acylating compound, and is complete when the evolution of hydrogen chloride has ceased after the addition of the last portion of the acylating agent. Varying temperatures and reaction rates may be employed in carrying out the esterification step as may be seen from the examples given further on. In carrying out the further step of esterification, especially when this is done at low temperatures, which is sometimes desirable, and in the case of mixtures of relatively high viscosity, the reaction mixture may tend to foam too much, and thus reduce the speed of the esterification reaction to an objectionable degree. In such cases an appropriate diluent, such as for instance ethylenechloride may be added to the mixture to reduce its viscosity and thus prevent objectionable foaming.

After the formation of the ester product, the process of purification of all of the novel compounds of the class with which this invention is concerned is similar and consists of an extensive washing with water to remove all traces of aluminum chloride, it having been found that the presence of even comparatively small amounts of residual aluminum chloride results in a lower stability of the final product. Due to the strong tendency of the ester products to emulsify when being washed with water, this washing is sometimes difficult, but it may be conveniently accomplished by adding to the wash water a small amount of some substance capable of breaking the emulsion, as for instance, lower alcohols, such as butanol. A convenient method of purification has been found to consist of washing the reaction product about six times, each time with an equal volume of water which contains 2% of butanol.

Examples of the novel compounds of the general class with which this invention is concerned, are cited below. In preparing these compounds there is first prepared the corresponding heavy alkyl-substituted or wax-substituted hydroxy-aromatic compound or phenol, such for instance as tetrawax phenol, triwax benzyl phenol, triwax resorcinol, triwax-o-hydroxydiphenyl, tetrawax B-naphthol, and triwax p-cresol, these compounds being prepared from the reaction mixtures as shown under the roman numerals I to VI inclusive below:

I—Tetrawax phenol

| | Grams |
|---|---|
| Chlorwax | 800 |
| Phenol | 74 |
| AlCl₃ | 24 |

II—Triwax benzyl phenol

| | Grams |
|---|---|
| Benzyl chloride | 66.4 |
| Phenol | 49.4 |
| AlCl₃ | 3.0 |
| Then— | |
| Chlorwax | 400 |
| AlCl₃ | 9 |

III—Triwax resorcinol

| | Grams |
|---|---|
| Chlorwax | 400 |
| Resorcinol | 58 |
| Alcl₃ | 40 |

IV—Triwax o-hydroxydiphenyl

| | Grams |
|---|---|
| Chlorwax | 400 |
| o-hydroxydiphenyl | 67 |
| AlCl₃ | 12 |

V—Tetrawax B-naphthol

| | Grams |
|---|---|
| Chlorwax | 400 |
| B-naphthol | 56.8 |
| AlCl₂ | 12 |

VI—Triwax p-cresol

| | Grams |
|---|---|
| Chlorwax | 400 |
| p-cresol | 56.8 |
| AlCl₃ | 12 |

The wax-substituted hydroxyaromatic products formed by the reaction according to the above examples were then further condensed with acid reagents, such as acetyl chloride, stearoyl chloride, benzoyl chloride, phthalyl chloride, adipyl chloride, sebacyl chloride, cinnamyl chloride, and montanoyl chloride. Since all of these reactions are in general similar, and in each case the proportions are such as to bring about esterification, detailed exemplary data will be limited to only a few of the various combinations of reaction mixtures referred to above, giving in each instance a short note describing the various specific reaction conditions.

VII—Tetrawax phenol condensed with acetyl chloride at 212° F.–300° F., time of reaction—thirty minutes

Reaction mixture:

| | Grams |
|---|---|
| Tetrawax phenol | 50 |
| Acetyl chloride | 7.8 |

VIII—Tetrawax phenol condensed with stearoyl chloride (acid chloride prepared from stearic acid of acid No. 210) at 250° F., time of reaction—twenty minutes

Reaction mixture:

| | Grams |
|---|---|
| Tetrawax phenol | 70 |
| Stearoyl chloride | 21.4 |

IX—Tetrawax phenol condensed with benzoyl chloride at 250° F.–300° F., time of reaction—twenty minutes

Reaction mixture:

| | Grams |
|---|---|
| Tetrawax phenol | 50 |
| Benzoyl chloride | 7.53 |

X—Tetrawax phenol condensed with phthalyl chloride at 175° F.–350° F., time of reaction—fifteen minutes

Reaction mixture:

| | Grams |
|---|---|
| Tetrawax phenol | 100 |
| Phthalyl chloride | 10.1 |

XI—Tetrawax B-naphthol condensed with montanoyl chloride (acid chloride prepared from montanoyl wax having acid No. 70) at 250° F.–350 F., time of reaction—twenty minutes

Reaction mixture:

| | Grams |
|---|---|
| Tetrawax B-naphthol | 50 |
| Montanoyl chloride wax | 42 |

(In this case, after water-washing, the product is heated to 350° C. at a pressure of 5 mm. abs. to remove wax.)

XII—Tetrawax phenol condensed with adipyl chloride at 125° F.–310° F., time of reaction—twenty minutes

Reaction mixture:

| | Grams |
|---|---|
| Tetrawax phenol | 50 |
| Adipyl chloride | 4.6 |

XIII—Tetrawax phenol condensed with sebacyl chloride at 300° F., time of reaction—twenty minutes

Reaction mixture:

| | Grams |
|---|---|
| Tetrawax phenol | 50 |
| Sebacyl chloride | 6 |

XIV—Tetrawax phenol condensed with cinnamyl chloride at 300° F., time of reaction—fifteen minutes

Reaction mixture:

| | Grams |
|---|---|
| Tetrawax phenol | 50 |
| Cinnamyl chloride | 8.5 |

The product, in each of the above instances, is finally purified by water-washing in the manner outlined in the above general discussion.

In some instances, in preparing the heavy alkyl-substituted or wax-substituted phenol as for instance in the preparation of triwax resorcinol, and in connection with certain other phenols which react in the Friedel-Crafts synthesis with a slightly greater difficulty than do the unsubstituted monohydroxyaromatic hydrocarbons for example, the proportion of aluminum chloride may conveniently be increased somewhat. In various of the esterification syntheses, when the reaction mixture is highly viscous at the desired reaction temperature, as in the case of the reaction of triwax resorcinol and acetyl chloride at 150° F.–350° F., a diluent or solvent such as ethylene chloride may be used to reduce the viscosity of the mixture to permit initiating the reaction with reasonable velocity. The diluent may be removed conveniently by allowing it to distill off as the temperature of the reaction is raised in the normal procedure. In other instances where there is some tendency for the reaction to proceed toward a resinification in the course of the esterification, as for instance when reacting tetrawax B-naphthol with phthalyl chloride, similar diluents may be used to reduce the viscosity of the reaction mixture and then may be removed by similar procedural steps.

The novel compositions of matter of the present invention, when the acyl radical contained therein corresponds to an organic acid, include a large group of products whose characterizing constituents are compounds typified by the general formula (1)

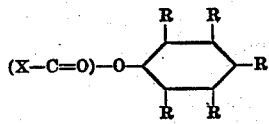

wherein (X—C=O) is a monovalent acyl radical of the monobasic or polybasic organic carboxylic acid typified by those acids of this class enumerated hereinbefore, and wherein R has the same significance as that outlined above and wherein X preferably is a radical selected from the group consisting of alkyl and aryl radicals, saturated or unsaturated, and which may or may not be substituted or oxidized, (as to a ketone form), in any manner known to have no substantially adverse effect upon the esterifying activity of the carboxyl group to which such radicals are attached.

Similarly the said compositions of the present invention of the class derived from organic acids comprises a second group of products whose characterizing constituents are compounds typified by the general formulae (2)

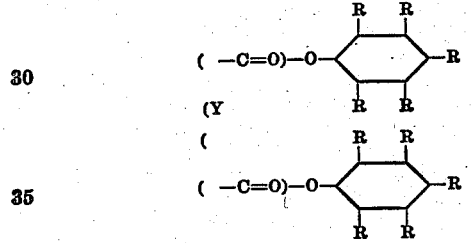

wherein

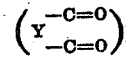

is the divalent acyl radical of a dibasic organic carboxylic acid typified by those dibasic organic carboxylic acids enumerated hereinbefore, and wherein R has the same significance as above and Y is a divalent aliphatic or aromatic radical or like substituted radical known to have no substantial effect upon the esterifying activity of the acyl group to which such radicals are attached; and wherein

is preferably a divalent phthalyl radical.

As indicated hereinbefore the compositions of the present invention also comprise products containing trivalent acyl radicals derived in the manner indicated above from organic carboxylic acids, containing three carboxyl groups, the general formula corresponding to which and hereinafter referred to as general formula (3) will be evident from the above discussion of the general formulæ (1) and (2).

In the general formulæ (1), (2) and (3) a two ring or three ring condensed aromatic nucleus corresponding to naphthalene and anthracene may be substituted for the single ring shown in formulæ (1) and (2) with a corresponding increased number of R's; and of the R's indicated, preferably three at least consist of a long chain alkyl radical corresponding to an aliphatic hydrocarbon of relatively high molecular weight, the remaining R's being preferably hydrogen.

To illustrate the effectiveness of the novel depressants of the present invention, the following table is presented in which the most important properties of certain of these depressants generally exemplary of those comprised within this invention are set forth. The data in this table represent tests upon mixtures containing the indicated percentages of the indicated compounds in admixture with a solvent-refined lubricating oil, which oil has a viscosity of 249'' Saybolt universal at 130° F. and a pour test in the untreated condition of 20° F. (The pour test indicated is the Standard A. S. T. M. Pour Test Method D97—27T, page 37, U. S. Bureau of Mines Technical Paper 323—B.). The vertical columns of the tabulation show (reading from left to right) first, the concentration of the depressant ingredient, expressed as per cent in oil, second, the pour test of the oil after addition of such per cent of depressant, and the third and fourth vertical columns show the pour test of the oil after exposure for two and three days respectively to a heat test in which the oil is held continuously at a temperature of 342° F. in a glass beaker while being continuously stirred with a steel propeller. A great number of tests in connection with a wide variety of lubricants have shown this heat test to be readily correlated with regular automotive use, a two-day test being the equivalent of 2,000 miles of normal driving and a three-day test being equivalent to 3,000 miles, etc.

*Tests of exemplary products of the present invention*

| Depressant | | A. S. T. M. pour test | | | |
|---|---|---|---|---|---|
| Starting compound | Acylating agent | Concentration percent | Initial | After heat test at 342° F. | |
| | | | | 2 Days | 3 Days |
| | | | °F. | °F. | °F. |
| Tetrawax phenol | None | ¼ | −25 | +5 | +10 |
| Tetrawax phenol | Acetyl chloride | ¼ | −25 | | −10 |
| Tetrawax phenol | Stearoyl chloride | ¼ | −15 | −15 | −20 |
| Tetrawax phenol | Benzoyl chloride | ¼ | −20 | | −15 |
| Tetrawax phenol | Phthalyl chloride | ¼ | −25 | | −25 |
| Tetrawax phenol | Phthalyl chloride | ⅛ | −20 | | −20 |
| Tetrawax phenol | Succinyl chloride | ¹⁄₃₂ | −10 | | −5 |
| Tetrawax phenol | Adipyl chloride | ⅛ | −25 | −20 | −25 |
| Tetrawax phenol | Adipyl chloride | ¹⁄₁₆ | −20 | −20 | −25 |
| Tetrawax phenol | Adipyl chloride | ¹⁄₃₂ | −15 | −10 | −10 |
| Tetrawax phenol | Sebacyl chloride | ⅛ | −25 | −25 | −25 |
| Tetrawax phenol | Sebacyl chloride | ¹⁄₁₆ | −20 | | −25 |
| Yetrawax phenol | Sebacyl chloride | ¹⁄₃₂ | −10 | −10 | −5 |
| Tetrawax phenol | Cinnamyl chloride | ¼ | −25 | | −25 |
| Tetrawax phenol | Cinnamyl chloride | ⅛ | −20 | −15 | −10 |
| Triwax benzyl phenol | None | ¼ | −25 | −5 | +5 |
| Triwax benzyl phenol | Acetyl chloride | ¼ | −5 | −5 | −5 |

Tests of exemplary products of the present invention—Continued.

| Depressant | | A. S. T. M. pour test | | | |
|---|---|---|---|---|---|
| | | | | After heat test at 342° F. | |
| Starting compound | Acylating agent | Concentration percent | Initial | 2 Days | 3 Days |
| | | | °F. | °F. | °F. |
| Triwax benzyl phenol | Stearoyl chloride | ¾ | +10 | −20 | −25 |
| Triwax benzyl phenol | Benzoyl chloride | ¾ | −15 | −10 | −5 |
| Triwax resorcinol | None | ½ | −25 | +15 | +15 |
| Triwax resorcinol | Acetyl chloride | ½ | −20 | | 0 |
| Triwax resorcinol | Stearoyl chloride | ½ | −25 | −25 | −25 |
| Triwax resorcinol | Benzoyl chloride | ½ | −10 | −5 | +10 |
| Triwax o-hydroxy diphenyl | None | ½ | −5 | +5 | +15 |
| Triwax o-hydroxy diphenyl | Acetyl chloride | ½ | 0 | −5 | +10 |
| Triwax o-hydroxy diphenyl | Stearoyl chloride | ½ | −20 | −25 | −20 |
| Triwax o-hydroxy diphenyl | Benzoyl chloride | ½ | −5 | 0 | +5 |
| Triwax o-hydroxy diphenyl | Phthalyl chloride | ¾ | −25 | −25 | −25 |
| Tetrawax β-naphthol | None | ½ | −20 | +15 | +15 |
| Tetrawax β-naphthol | Acetyl chloride | ½ | −20 | | −15 |
| Tetrawax β-naphthol | Stearoyl chloride | ½ | −20 | −25 | −20 |
| Tetrawax β-naphthol | Benzoyl chloride | ½ | −20 | | −10 |
| Tetrawax β-naphthol | Phthalyl chloride | ½ | −20 | | −20 |
| Tetrawax β-naphthol | Montanoyl chloride | ½ | +10 | −20 | −25 |
| Triwax p-cresol | None | 1 | +20 | | |
| Triwax p-cresol | Phthalyl chloride | 1 | −10 | | |

From the above table it is evident that the esterification of the wax-substituted hydroxyaromatic products produces depressants of considerably more uniform effectiveness, and which are far more reliable and capable of retaining their desirable characteristics when exposed to the normal conditions of use than the corresponding original non-esterified wax-substituted phenols.

As pointed out earlier in this specification, the term "acylation" was applied to the reaction with which this invention is concerned, and it was pointed out that the term was so used because the reaction while mainly one of esterification frequently also results in the formation of a limited proportion of ketones and some other substances. Minor variations in the efficiency of the above products is sometimes observed between products of different reaction batches prepared by the same procedure but which have been handled in differing manner. We believe that such variations in efficiency are largely due to variations in the proportions of ketones, etc., present, this being especially true in variations in their effectiveness after the heat test, since we have found that such compounds when preponderantly ketonic in composition sometimes lose their effectiveness quite rapidly on exposure to this heat test. Consequently where the term "esterification" is used in the following claims, it is intended to designate a reaction which is predominantly one of esterification, although the presence of some ketones and other compounds is recognized and is known to be a part of the reaction so described.

We claim:

1. A mineral oil composition comprising a liquid oil and a waxy hydrocarbon, and in admixture therewith a small proportion of an ester of an organic carboxylic acid and a wax-substituted hydroxyaromatic compound, said ester having the power of depressing the pour point of the oily mixture.

2. A mineral oil composition comprising a liquid oil and a waxy hydrocarbon, and in admixture therewith a small proportion of an ester of an aliphatic carboxylic acid and a wax-substituted hydroxyaromatic compound, said ester having the power of depressing the pour point of the oily mixture.

3. A mineral oil composition comprising a liquid oil and a waxy hydrocarbon, and in admixture therewith a small proportion of an ester of an aromatic carboxylic acid and a wax-substituted hydroxyaromatic compound, said ester having the power of depressing the pour point of the oily mixture.

4. A mineral oil composition comprising a liquid oil and a waxy hydrocarbon, and in admixture therewith a small proportion of a substance made by condensing a hydroxyaromatic compound selected from the group consisting of compounds of the general formulæ

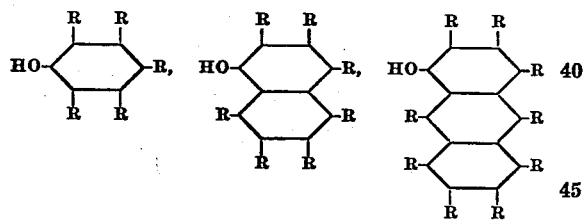

where R represents radicals selected from the group consisting of hydrogen, hydroxy, alkyl, aryl, aralkyl, alkaryl, aroxy, and alkoxy, with chlorinated wax in the presence of aluminum chloride as a catalyst, and subsequently esterifying the resulting product with an acylating agent selected from the group consisting of organic carboxylic acids, organic carboxylic acid chlorides and organic carboxylic acid anhydrides, said esterified product having the property of depressing the pour point of the oil.

5. A mineral oil composition comprising a liquid oil and a waxy hydrocarbon, and in admixture therewith a small proportion of a compound made by condensing a member selected from the group consisting of compounds of the general type

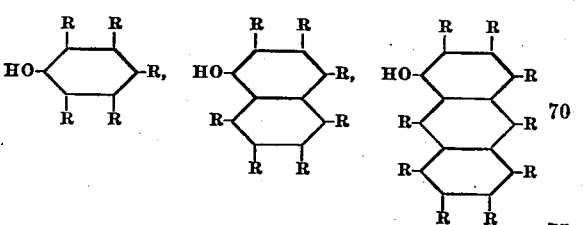

where R represents radicals selected from the group consisting of hydrogen, hydroxy, alkyl, aryl, aralkyl, aroxy, and alkoxy, with chlorinated wax in the presence of aluminum chloride, and subsequently esterifying the resulting product with a substance selected from the group consisting of the acid chlorides and acid anhydrides of the following radicals: Acetyl, palmitoyl, stearoyl, montanoyl, benzoyl, phthalyl, adipyl, succinyl, sebacyl, cinnamyl, said esterified product having the property of depressing the pour point of the oil.

6. A mineral oil composition comprising a liquid oil and a waxy hydrocarbon, and in admixture therewith a small proportion of a compound made by condensing a member selected from the group consisting of compounds of the general formula

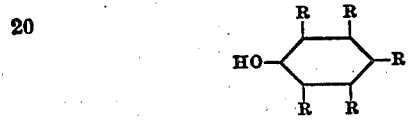

where R represents radicals selected from the group consisting of hydrogen, hydroxy, alkyl, aryl, aralkyl, alkaryl, aroxy, and alkoxy, with chlorinated wax in the presence of aluminum chloride, and subsequently esterifying the resulting product with a substance selected from the group consisting of organic acid chlorides and organic acid anhydrides, said esterified product having the property of depressing the pour point of the oil.

7. A mineral oil composition comprising a liquid oil and a waxy hydrocarbon, and in admixture therewith a small proportion of a compound made by condensing a member selected from the group consisting of compounds of the general type

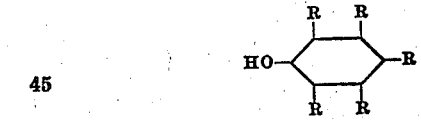

where R represents radicals selected from the group consisting of hydrogen, hydroxy, alkyl, aryl, aralkyl, alkaryl, aroxy, and alkoxy, with chlorinated wax in the presence of aluminum chloride, and subsequently esterifying the resulting product with a substance selected from the group consisting of the acid chlorides and acid anhydrides of the following radicals: Acetyl, palmitoyl, stearoyl, montanoyl, benzoyl, phthalyl, adipyl, succinyl, sebacyl, cinnamyl, said esterified product having the property of depressing the pour point of the oil.

8. The method of producing a lubricating oil of relatively low pour point which comprises condensing a hydroxyaromatic compound with a chlorinated wax of high melting point in the presence of aluminum chloride, then reacting the condensation product with a reagent selected from the group consisting of acid chlorides and acid anhydrides of organic carboxylic acids, and admixing the final esterified reaction product in a minor proportion with a lubricant oil of relatively high pour point.

9. The method of producing a lubricant oil of relatively low pour point which comprises chemically condensing a hydroxyaromatic compound selected from the group consisting of compounds of the general formulae

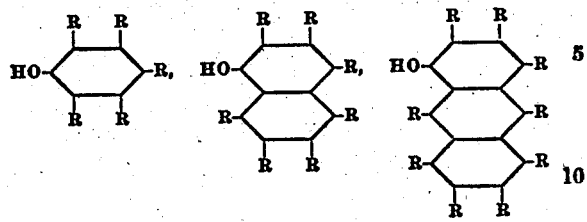

where R represents a radical selected from the group consisting of hydrogen, hydroxy, alkyl, aryl, alkaryl, aroxy, and alkoxy, with a chlorinated aliphatic hydrocarbon compound of relatively high molecular weight to form the corresponding alkyl substituted hydroxyaromatic compound, esterifying the condensation product thus obtained with a substance selected from the group of acylating agents consisting of organic carboxylic acids and the acid chlorides and acid anhydrides of organic carboxylic acids, washing the resulting mixture with water and adding a small proportion of the final esterified product to a lubricant oil of relatively high pour point.

10. The method of producing a lubricant oil of relatively low pour point which comprises chemically condensing a hydroxyaromatic compound selected from the group consisting of compounds of the general formulae

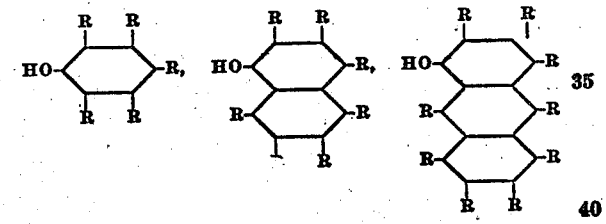

where R represents radicals selected from the group consisting of hydrogen, hydroxy, alkyl, aryl, aralkyl, alkaryl, aroxy, and alkoxy, with chlorinated wax in the presence of aluminum chloride as catalyst, and subsequently esterifying the resulting condensation product with an acylating agent selected from the group of acylating agents consisting of the acid chlorides and acid anhydrides corresponding to the following acids: Acetic palmitic, stearic montanic, benzoic, phthalic, adipic, sebacic, succinic, cinnamic, washing the resulting esterified product with water to remove the catalyst and adding a small proportion of the final washed esterified product to a lubricant oil of relatively high pour point, the said esterified product having the property of depressing the pour point of the said lubricant oil.

11. The method of producing a lubricant oil of relatively low pour point which comprises the steps of chemically condensing a hydroxyaromatic compound selected from the group consisting of compounds of the general formulae

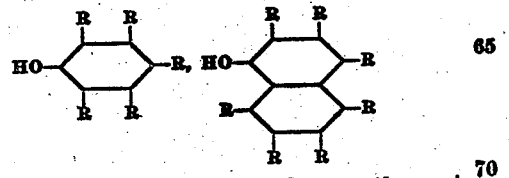

where at least four R's are hydrogen, the rest being hydroxy, alkyl, or aryl, with a chlorinated aliphatic hydrocarbon compound of relatively high molecular weight, containing about 14% of chlorine, in the presence of aluminum chloride as catalyst with heating, the proportions of the hydroxyaromatic compound and chlorinated hydrocarbon being such that at least three and not more than four of the R's which are hydrogen are replaced by the aliphatic alkyl radical of the chlorinated compound, esterifying the alkyl-substituted hydroaromatic compound thus obtained with an acylating agent selected from the group consisting of the acid chlorides and acid anhydrides of the following radicals: Acetyl, palmitoyl, stearoyl, montanoyl, oleyl, benzoyl, adipyl, sebacyl, succinyl, cinnamyl, and phthalyl separating the aluminum chloride from the esterified product and admixing a small proportion of the purified esterified product thus obtained with a lubricant oil of relatively high pour point.

ORLAND M. REIFF.
DARWIN E. BADERTSCHER.

Patented July 21, 1936

2,048,466

UNITED STATES PATENT OFFICE 2,048,466

MINERAL OIL COMPOSITIONS AND METHOD OF MAKING SAME

Orland M. Reiff and Darwin E. Badertscher, Woodbury, N. J., assignors to Socony-Vacuum Oil Company, Incorporated, New York, N. Y., a corporation of New York No Drawing. Application March 12, 1936, Serial No. 68,503

11 Claims. (Cl. 87—9)

This invention is directed to pour point depressants. That is to say it is directed to materials which when added to a homogeneous mixture of liquid oils and paraffinic or waxy materials will tend to depress the temperature at which the oil-wax mixture will congeal or cease to flow. Lubricant oils of the nature of motor oils exemplify such an oil-wax mixture. Dependent upon the proportion of wax therein, such oils may congeal and cease to flow at temperatures of 50° F. or 60° F. or lower. Although the proportion of wax as expressed in percentage is not high, chilling below the congealing point appears to result in the formation of a lattice like structure of wax crystals in the interstices of which the liquid oil is held, the whole then being of a relatively non-flowing nature. In normal practice the reduction of the pour point of such an oil is accomplished to a limited degree by chilling to a temperature at which wax crystals are formed, usually after the addition of some diluent, and then filtering off the precipitated wax. This result may be readily accomplished for the production of oils having pour points of from 20° F. to 35° F. In the production of lubricating oils having lower pour points, however, the removal of wax by this method becomes burdensome and expensive and usually entails considerable loss of valuable product. Furthermore, the complete removal of the wax is frequently undesirable for the reason that oils containing a certain amount of wax-like materials congealing at 25° F. or a few degrees lower give better lubricating service than oils from which these materials have been largely removed. However, in order to insure proper flowing of oil, and consequent necessary lubrication at low temperatures, as is the case in lubricating an automobile in winter, it is highly desirable that the congealing or pour point of an oil be —20° F. or below, and to produce this useful property in an oil, it is now current practice to dewax only to a pour point of about 20° F. or 25° F., and to depress the pour point further to the desired lower limit by adding to the oil some depressant substance capable of preventing the congealing of the oil at a temperature above that desired. This invention is more specifically concerned with the provision of an improved additive material of this nature.

Pour point depressants hitherto proposed have consisted of the condensation products of chlorinated waxes with aromatic hydrocarbons, condensation products of chlorinated waxes with phenolic compounds, and certain products produced by resinification of the last-named products with a resinification reagent such as an aldehyde. None of the above-named wax-phenol compounds have possessed entirely satisfactory stability however. That is when exposed to the normal operating conditions under which lubricant oils are used, they tend to lose their depressing power. The most nearly satisfactory of the classes of compounds above noted in respect to such stability as well as efficiency are the condensation products of chlorwaxes with phenolic products and the corresponding resinified products mentioned above. The resinified compounds must be only partially resinified, however, in order to produce a maximum depressant effect, and under continued exposure to elevated temperatures, as in an automobile crankcase, these compounds appear to slowly condense or resinify further, this further resinification resulting in a decrease in their solubility in oil and other changes in their nature which greatly reduce their effectiveness as pour point depressants. Similarly the condensed chlorwax-phenolic compounds appear to be subject to slow oxidation under prolonged exposure to elevated temperatures, which also apparently results in some kind of further resinification or polymerization or other change which slowly reduces their depressant activity. With certain older types of oils which tended to spontaneously deteriorate comparatively rapidly in any event as from the formation of sludge, the maintenance of depressant stability of a high degree was not of major importance. But with the more modern oils of the highly refined type at present available, spontaneous deterioration from such causes is not great, and it consequently becomes necessary to produce pour depressants which are highly stable and capable of retaining their depressant ability under continued exposure to the conditions of normal use. This invention therefore has for another of its principal objects the provision of a novel pour point depressant of i tially high effectiveness, and of high stability, capable of retaining its depressant ability under prolonged exposure to elevated temperatures. Other important objects are: The provision of such a depressant which is highly soluble in mineral oils; the provision of a novel depressant compound highly resistant to decomposition under extremely adverse conditions, such as are present in the crankcase of an automobile engine, at elevated temperatures in contact with water, atmospheric oxygen and the like, and which are not susceptible of decomposition into products which are normally corrosive toward the materials usually used in the machinery to be lubricated. A major object of this invention is the provision of hydrocarbon lubricating oils of relatively low pour points, comprising oils of normally high pour points and in admixture therewith an oil-soluble, stable, substantially neutral or non-corrosive and efficient pour point depressant. A further important object is the provision of methods for preparing the products referred to above including the finished lubricating oil containing the improved depressant in substantially stable homegeneous admixture of solution therewith, and having a constant or stable relatively low pour point. Other objects and advantages are in part obvious from the following more detailed description of our invention and still others are specifically pointed out in connection with such description.

This invention is based upon the discovery that a novel pour depressant having the above desirable properties and advantages can be produced by chemically condensing together monohydroxy benzene or phenol and a chlorinated aliphatic hydrocarbon compound of relatively high molecular weight to form a heavy alkyl-substituted phenol, and thereafter esterifying this phenolic condensation product by chemically reacting it with phthalic acid chloride or phthalic acid anhydride or other convenient acylating agent containing the phthalyl radical to form the corresponding ester.

In the preparation of our novel improved pour point depressant, we employ as one of the starting materials ordinary phenol or monohydroxybenzene, and while we may use any of the commercial grades of phenol containing certain impurities normally contained therein, we prefer to use those grades which are more completely freed of the cresols and other similar homologues of phenol. For the introduction of the heavy alkyl hydrocarbon radical into the benzene nucleus, we prefer to make use of a chlorinated wax, such as may be prepared from a paraffin wax melting at approximately 120° F. to 130° F., and having a molecular weight of the order of 250 and upward. Materials having relatively short alkyl chains or low melting points are not capable of yielding the preferred product of the present invention and hence the use of heavy petroleum oil, petrolatum, wax distillate and the like is not as desirable for the purposes of this invention as the crystallin paraffin wax referred to above. Although such a wax may be derived from other sources, it is more convenient to obtain it from petroleum by the usual methods. When the wax is melted and heated to about 200° F. chlorine may be bubbled through it until the desired amount of chlorine, about 14%, is absorbed. Higher temperatures hasten this reaction, but if too high are likely to darken the product. The degree of chlorination of the chlorwax is of considerable importance. With low percentages of chlorine in the wax the depressant effect of the final product is low, and this may be increased by increasing the chlorine percentage, but above about 14% the chlorwax-phenol product tends to become too resinous and less soluble in oil, as well as less stable at elevated temperatures. We prefer therefore, to use wax of about 120° F. melting point, which has been chlorinated to such an extent that it contains about 14% of chlorine.

The phthalyl radical may be conveniently brought into the reaction either in the form of phthalic anhydride or as phthalyl chloride, since as is well known either acid chlorides or acid anhydrides may be conveniently used for the formation of esters of the phenols. However, we prefer to use phthalyl chloride. In making the phthalyl ester of the wax-substituted phenol of our invention, we prefer to employ the well-known Friedal Crafts reaction, using aluminum chloride as the catalyst, and for this purpose aluminum chloride of the technical degree of purity may be used.

The preferred method of formation of our improved depressant is as follows: We first prepare the condensation product of chlorwax and phenol. To do this, we use phenol and chlorwax in the proportions of one equivalent of phenol to four equivalents of chlorine in a chlorwax containing 14% of chlorine. These proportions are of importance, since we have found that the resulting product, which corresponds to a tetrawax phenol, results in the formation of more effective depressants than is obtainable with any other proportion or any other degree of substitution. The admixed phenol and chlorwax are heated to about 150° F. and anhydrous aluminum chloride is added to this mixture. The amount of aluminum chloride added should amount to about 3% of the weight of the chlorwax. Other percentages of the catalyst may be used but we have found that substantial variation from this preferred percentage frequently necessitates the employment of undesirable reaction temperatures or results in undesirable rates of reaction. While adding the catalyst, the mixture should be actively stirred, and the rate of addition should be sufficiently slow to avoid objectionable foaming. During the addition of the aluminum chloride the temperature should be held at about 150° F. After the addition of the aluminum chloride has been completed, the temperature of the mixture is first raised slowly during a period of about 15 to 25 minutes to about 250° F., and thereafter at a rate preferably not in excess of approximately 1° F., per minute to a temperature of 350° F. When properly carried out the evolution of hydrochloric gas will have ceased substantially when this final temperature is reached. If this evolution of gas has not ceased, the mixture may be held for a short time at about this temperature until such evolution has substantially ceased. The reaction mixture is then cooled to a temperature of about 300° F., and the phthalyl chloride is then gradually added. We prefer to add this acylating reagent in proportions corresponding to the complete esterification of the phenol. That is for one mole of phenol in the original reaction mixture, we prefer to add one-half mole of phthalyl chloride. A lesser amount of the acid may be used with a proportionately lesser stabilization effect on the resulting depressant. We prefer to add the phthalyl chloride at a temperature of about 300° F., since at this temperature the wax-phenol product is of low viscosity, and the reaction proceeds readily. At lower tempera-